Oct. 6, 1970　　H. SCHAINHOLZ ET AL　　3,532,418
VISUAL ACUITY TESTING APPARATUS

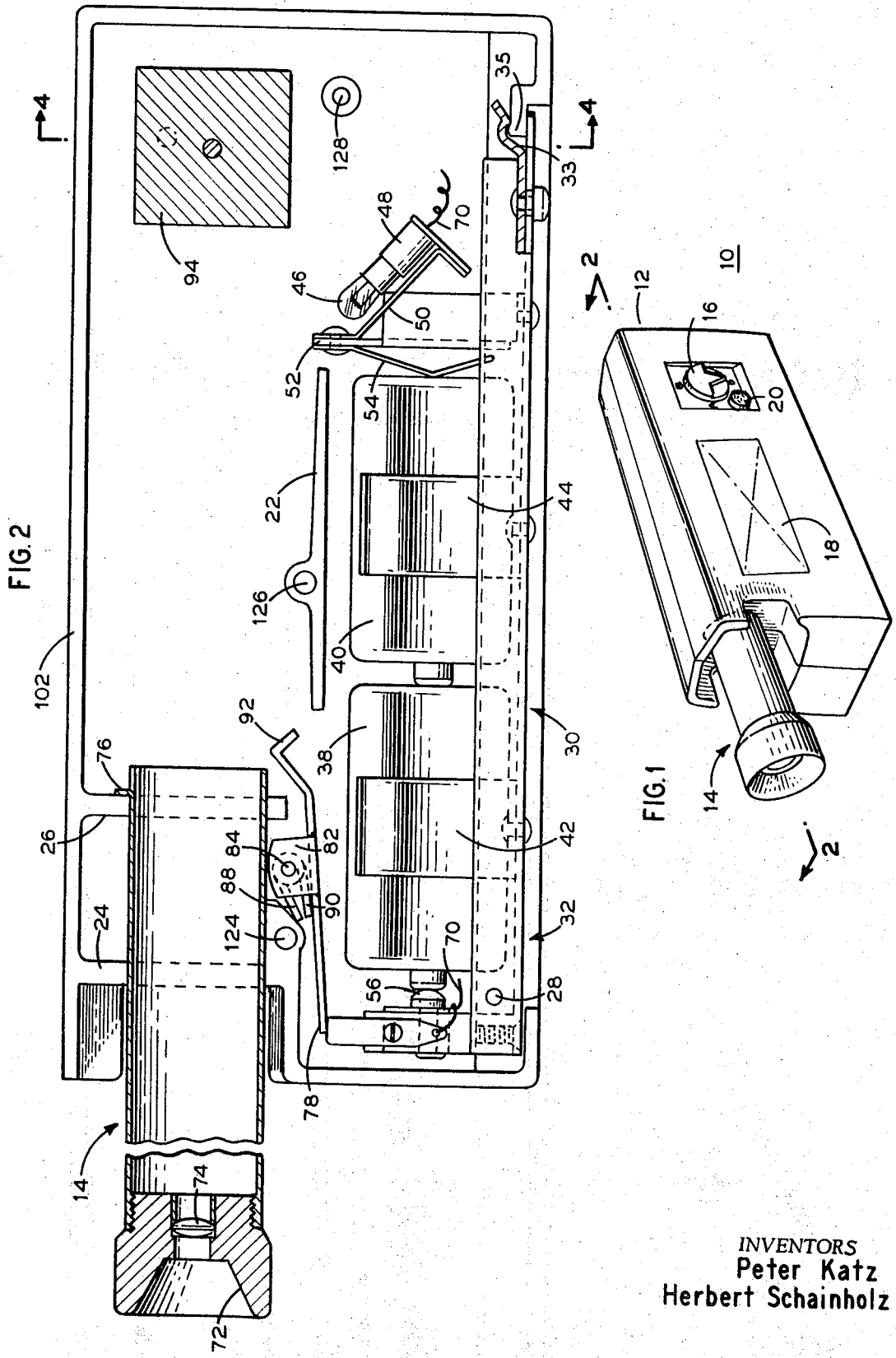

Filed May 21, 1968　　2 Sheets-Sheet 2

United States Patent Office 3,532,418
Patented Oct. 6, 1970

1

3,532,418
VISUAL ACUITY TESTING APPARATUS
Herbert Schainholz, 3777 Independence Ave., Riverdale, N.Y. 10463, and Peter Katz, 18 Locust Place, Livingston, N.J. 07039
Filed May 21, 1968, Ser. No. 730,771
Claims priority, application Great Britain, Jan. 9, 1968, 1,242/68
Int. Cl. A61b *3/00, 3/02;* G09a *13/02*
U.S. Cl. 351—36                                    3 Claims

ABSTRACT OF THE DISCLOSURE

A portable, visual acuity testing instrument has a rotatable, detentable test chart carrying block, positioned in a light excluding housing in transverse axial alignment with an extendible lens carrying barrel. Withdrawal of the lens barrel to a fully extended position effects illumination by a lamp within the housing of the test chart carrying block.

---

The present invention relates to opthhalmic instruments and, more particularly, to visual acuity testing apparatus.

Heretofore, visual acuity testing devices have been large bulky pieces of apparatus, not easily adapted to portability. The user of the instrument first had to be directed to the situs of the instrument, and then seated in a special place before it in order that an eye test could be conducted. Furthermore, the eye charts of such instruments were often presented on transparent slides, thereby making a quick change of test charts somewhat difficult, since the chart must be removed and a new one selected from an accessory box of slides and inserted in the instrument.

Such an instrument usually would then have to be refocused to accommodate the change in slides.

It is, therefore, an object of the invention to provide a lightweight, portable, compact, simple to operate visual acuity tester.

It is a further object of the invention to provide a portable visual acuity tester in which the testing charts can be rapidly changed without requiring focusing of the instrument or removal of the instrument from in front of the viewer's eye.

A still further object of the present invention is to provide a new and improved visual acuity tester which can be manufactured and sold at a comparatively nominal cost as compared with prior testers.

These and other objects and advantages of the invention will become more fully apparent in the course of the following detailed description, taken in connection with the accompanying drawings wherein:

FIG. 1 is a perspective view of a visual acuity testing instrument embodying the novel features of the present invention;

FIG. 2 is a longitudinal sectional view taken along the lines 2—2 of FIG. 1;

2

Figure 3:
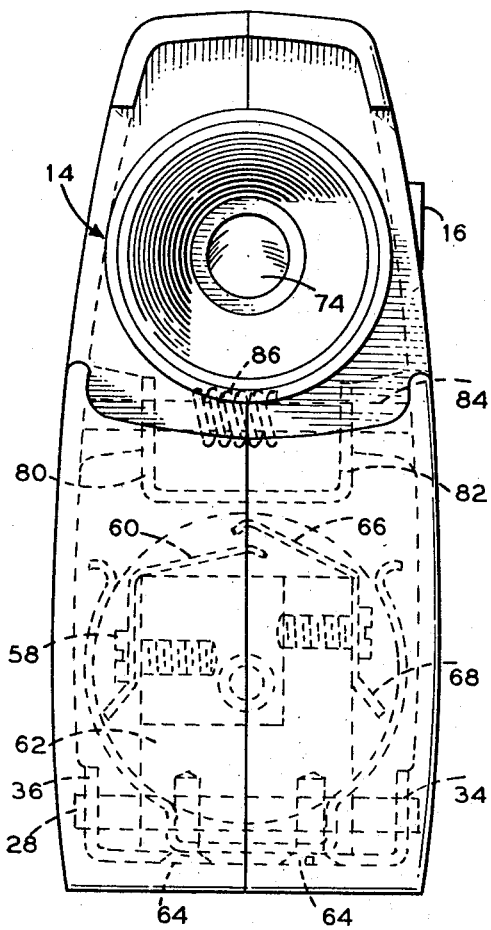
FIG. 3 is an end view of the instrument of the present invention.

Referring now to FIG. 1 of the drawings, there is shown a visual actuity testing instrument 10 of the present invention, which comprises a housing 12, a retractable lens barrel 14 and a vision testing chart selector knob 16. The available chart selection positions are indicated as A, B, C, D. The chart legends may be listed on a suitable label 18 affixed to the side of housing 12 and would probably include a "Snellen" chart along with other vision testing charts. Housing 12 may be formed in one or more sections from any conventional material such as a suitable thermoplastic resin or the like, with the sections being secured to one another in accordance with conventional fastening means. The instrument is light in weight and is adapted to be held conveniently in one hand while the viewer positions lens barrel 14 adjacent the eye to be tested. A small pilot light jewel 20 is provided to indicate when an eye testing chart is being internally illuminated within the housing 12.

Referring now to FIG. 2, housing 12 is preferably formed from two longitudinally mating half sections (only one being shown in FIG. 2 and designated as 102), with each having a projection 22 which, when assembled, form an internal transverse strengthening wall for housing 12 and also define a battery cavity therewithin. Each half section of housing 12 also has projections 24, 26 which, when mated with corresponding projections in the other half section, form a pair of internal supporting walls for slidable lens barrel 14. Projections 22, 24, 26, may be integrally molded into the side walls of housing 12.

Rotatably mounted adjacent the base of housing 12 by means of a pivot pin 28 is a cover plate 30 which covers a longitudinal aperture or opening 32 in the base of housing 12. Plate 30 is held in aperture covering position by means of a resilient spring catch 33 which engages a projection 35, preferably molded in the body of housing 12 to form a captivated fastener. Cover plate 30 has upstanding side walls 34, 36 which cooperate to form a strong channel member and also act as a bracket to which components may be attached. Pivot pin 28 passes through corresponding apertures in side walls 34, 36 and is seated in suitable cavities formed in the walls of each half section of housing 12. Pivot pin 28 thereby provides an axis about which plate 30 is able to rotate downwardly through aperture 32, when access to the interior of housing 12, or to the components mounted on plate 30, is desired.

Mounted on cover plate 30 is a battery and lamp assembly which comprises a pair of conventional batteries 38, 40 connected in series and held in place on plate 30 by means of resilient spring clips 42, 44 secured as by rivets to plate 30, and a lamp 46 mounted in a lamp socket 48. Lamp socket 48 is secured to a reflector bracket 50 which is angularly mounted on upstanding bracket 52. Attached to bracket 52 is a spring contact member 54 which presses against the base of the battery 42 to make electrical contact therewith. The positive terminal of battery 38 electrically engages with a contact button 56 which is electrically connected via mounting screw 58 to a leaf spring contact member 60 (FIG. 3).

Contact button 56, screw 58 and leaf spring 60 are mounted on an insulating terminal block 62, which, in turn, is secured to cover plate 30 as by screws 64. A corresponding leaf spring contact 66 is also mounted on the other side of insulating block 62 in a position such that when leaf spring contact 66 is pressed downwardly it engages and forms an electrical contact with leaf spring 60. Leaf spring contact 66 has a terminal projection 68 which is connected by means of lead 70 to the center base pin terminal of lamp 48. It will therefore be noted that when leaf spring contacts 60 and 66 are engaged with each other, an electrical circuit will be completed so that the serially combined potential of batteries 38, 40 is applied to lamp 46 to energize same.

Lens barrel 14, slidably mounted in suitable apertures formed by projecting walls 24, 26 of each half of housing 12, has a removable, conventional threaded eye piece 72 mounted in the outer end thereof, which also serves to retain lenses 74 in a desired position. Lens barrel 14 has a projecting stop 76 which may be struck up from the inner end thereof and which is adapted to abut projecting wall member 26 when lens barrel 14 is extended, and thus limit the extended length thereof. A switch actuating arm 78 is pivotally mounted beneath lens barrel 14, has a pair of apertured upstanding tabs 80, 82, through which pass a pivot pin 84. A compression spring 86 wound about pivot pin 84 has extending fingers 88, 90 which are respectively positioned against a wall of housing 12 and actuating arm 78 in such a manner that actuating arm 78 tends to be forced down against switch contacts 60, 66 to place them in a closed position. Pivot pin 84 is journalled in apertures of proper diameter molded in the side walls of housing 12.

Switch actuating arm 78 has an upwardly projecting finger 92 which slidably engages the lower surface of lens barrel 14. The length and angular disposition of finger 92 with respect to actuating arm 78 is so dimensioned that when it is in contact with lens barrel 14, actuating arm 78 is held away and prevented from closing switch contacts 60, 66. When lens barrel 14 is fully extended, finger 92 is out-of-contact therewith, so that spring 86 is free to force actuating arm 78 downward against contacts 60, 66 and thereby close the electrical circuit connected thereto. Thus, in operation, lamp 46 is lighted whenever barrel 14 is moved to its fully extended position.

Figure 5:
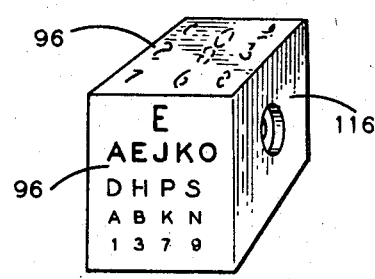
FIG. 5 is a perspective view of the test chart display block.

A test chart display block 94 is rotatably mounted between the longitudinal side walls of housing 12 in such a manner that its axis of rotation is in transverse, horizontal alignment with the longitudinal axis of lens barrel 14. Accordingly, the symbols forming a selected eye test chart, affixed to one of the sides 96 of block 94 facing lens barrel 14 (FIGS. 2, 5), will be in accurate alignment therewith and may be evenly viewed by the viewer. While for purposes of illustration, block 94 is shown as having four surfaces or sides to which discrete testing charts may be affixed, it will be understood that block 94 may have more or less than four sides.

Figure 4:
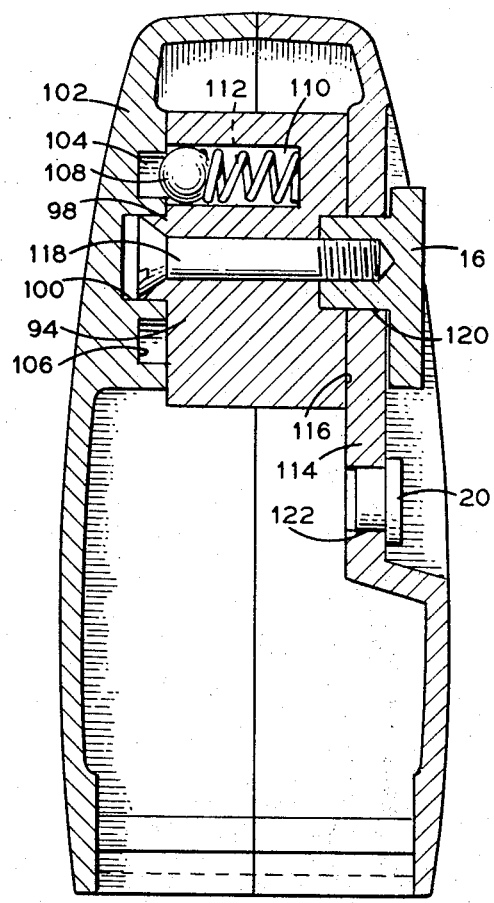
FIG. 4 is a cross-sectional view taken along the lines 4—4 of FIG. 2.

Referring now to FIG. 4, block 94 has a neck portion 98, which mates with a cavity 100 disposed in wall 102 of housing 12 to rotatably position block 94 in proper position with respect to lens barrel 14. Wall 102 has a plurality of detents, two of which are shown and indicated as 104, 106. These detents cooperate with a ball 108 rotatably positioned in a cavity 110. A compression spring 112, also disposed in cavity 110, forces ball 108 outwardly against side wall 102 or into one of detents 104, 106, or into other selectively located detents (not shown) to locate properly block 94 in one of its selected positions. It will be appreciated that for the four sided block 94, two additional detents are disposed in wall 102 at positions such that when block 94 is rotated, a detent action will occur each time one of faces 96 is brought into perpendicular alignment with the longitudinal axis of lens barrel 14. When the two walls of housing 12 are assembled in an ambient light excluding relationship, wall 114 slidably engages block surface 116 to form a bearing surface therewith.

Knob 16 is attached to block 94 as by screw 118, both of which pass through an aperture 120 in wall 114, knob 16 thereby providing a convenient means for rotating block 94 into one of its selected positions. Thus, by rotating knob 16 to any of positions A, B, C, D (FIG. 1), block 94 will present one of the four test charts carried thereby to the user of the instrument. Pilot light jewel 20 is positioned in an aperture 122 in side wall 20. Accordingly, when lamp 46 is lit, the light therefrom will be transmitted through jewel 20 to indicate that a selected test chart has been illuminated and that the instrument is therefor in operative condition.

It will be appreciated that when the instrument is in operation, the selected test chart to be viewed is always in focus since the "in-focus" condition occurs when lens barrel 14 is completely extended until stop 76 engages wall projections 26 to place the focal point of said lens substantially in the plane of the test chart face. Thus, if necessary, the focus may be adjusted by manipulation of the position of stop 76 during assembly of the instrument. Switch arm 92 may be bent in such a manner that switch contacts 60, 66 will not close until lens barrel 14 is fully extended, thereby insuring that a selected test chart in block 94 can not be illuminated and viewed in an out-of-focus condition.

The degree of magnification of lens 74 and the height of the symbols on the test charts affixed to blocks 94 may be so selected that standard eye test conditions will be effectively reproduced, i.e., a 20/20 Snellen chart. The interior of the instrument is preferably a light or white color to aid in even illumination of a selected test chart and is sealed from any external light source. Illumination of the chart is further enhanced by the reflection of light from the surface of bracket 50 immediately adjacent to bulb 46, and which preferably has a shiny surface.

When all of the components have been arranged as shown in FIG. 1, side wall 114 of housing 12 may be secured to side wall 102 to hold the components in an assembled relationship by means of screws (not shown) passing through wall 114 to engage threaded bores 124, 126 and 128, disposed in wall 102.

What is claimed is:

1. Eye testing apparatus comprising, a housing, a lens, movable means mounted on said housing for selectively positioning said lens from a retracted position to a fully extended position beyond the confines of said housing, a movable eye test chart carrier mounted in said housing and having a plurality of chart carrying faces each separately positionable transverse to the axis of said lens means, means for moving said chart carrier to place a selected chart face in said transverse position, first stop means projecting transversely from said lens positioning means, second stop means disposed within said housing, said first and second stop means being operative to mutually cooperate to limit the outward movement of said lens positioning means and stop it in said fully extended position wherein the focal point of said lens lies substantially in the plane of each chart test face when disposed in said transverse position, lamp means for illuminating said chart faces, and means for automatically energizing said lamp means only when said lens positioning means is moved to said fully extended position.

2. The invention defined in claim 1 wherein said lamp energizing means includes a source of potential and switch means coupled thereto including contact means for connecting said source of potential to said lamp, said switch means further including contact actuating arm means movable to an "off" position and an "on" position, said lens positioning means when retracted to less than fully extended position maintaining said actuating arm means in "off" position to open said contact means, and when in fully extended position releasing said actuating arm means to assume said "on" position, and means yieldably urging said contact means closed when said actuating arm means is released.

3. The invention defined in claim 1 wherein said housing has an elongated opening in the base thereof, a pivotally mounted base plate extending across said opening to form a closure therefor, said lamp means and said means to energize said lamp means being mounted on said base plate, said base plate being adapted to pivot outwardly away from said housing to facilitate across to said lamp means and said means to energize said lamp means.

References Cited

UNITED STATES PATENTS

| | | | |
|---|---|---|---|
| 829,515 | 8/1906 | Dunkel | 200—61.8 |
| 2,987,957 | 6/1961 | Lovegrove | 356—224 |
| 1,193,735 | 8/1916 | Sutter | 351—37 X |
| 2,364,793 | 12/1944 | Jobe et al. | 351—36 |
| 2,466,958 | 4/1949 | Long | 351—37 X |
| 2,530,531 | 11/1950 | McClellan | 350—134 |
| 2,602,366 | 7/1952 | De Liso | 40—63 |
| 3,012,472 | 12/1961 | Feinberg et al. | 351—36 |
| 3,205,505 | 9/1965 | Fletcher et al. | 351—32 |

FOREIGN PATENTS 7,295    2/1903    Great Britain.

OTHER REFERENCES

"A New Vision Test for Young Children," The Optician, vol. 150, No. 3877, July 23, 1965, p. 5.

DAVID SCHONBERG, Primary Examiner

P. A. SACHER, Assistant Examiner

U.S. Cl. X.R.

40—106.1; 351—17, 32